United States Patent
Beckmann et al.

[15] 3,686,388
[45] Aug. 22, 1972

[54] METHOD FOR PREPARING DIMENSIONALLY STABLE ARTICLES OF POLYBUTENE-1

[72] Inventors: Gunter Beckmann; Hans-Ulrich Finkmann, both of Marl, Germany

[73] Assignee: Chemische Werke Huels A.G., Marl, Germany

[22] Filed: Dec. 9, 1968

[21] Appl. No.: 782,410

[30] Foreign Application Priority Data

Dec. 22, 1967 Germany..........P 16 79 981.8

[52] U.S. Cl. ...............264/237, 260/93.7, 260/94.9, 264/232, 264/293, 264/295, 264/339, 264/348
[51] Int. Cl. .......B29c 17/02, B29c 25/00, C08f 3/12
[58] Field of Search......264/210, 294, 346, 234, 232, 264/237, 348, 339, 292, 295, 243, 296, 230; 260/93.7, 94.9

[56] References Cited

UNITED STATES PATENTS

| | | | |
|---|---|---|---|
| 3,468,862 | 9/1969 | Schotland | 264/346 |
| 2,952,042 | 9/1960 | Garsson | 264/292 |
| 3,532,366 | 10/1970 | Rakus et al. | 264/230 |

*Primary Examiner*—Robert F. White
*Assistant Examiner*—Jeffery R. Thurlow
*Attorney*—I. William Millen, M. Ted Raptes, John L. White and Millen, Raptes & White

[57] ABSTRACT

Dimensionally stable articles of poly-1-butene making at least 70% isotactic structure formed by:
 a. preparing isotactic poly-1-butene from 1-butene;
 b. forming molten poly-1-butene into semi-finished products at about 200-280° C and permitting the semi-finished products to cool;
 c. cold forming the semi-finished products at below 80° C into final shapes within thirty minutes of cooling; and
 d. storing the shaped articles about 0.5 to 12 hours while avoiding the effects of larger forces on the articles.

10 Claims, No Drawings

METHOD FOR PREPARING DIMENSIONALLY STABLE ARTICLES OF POLYBUTENE-1

CROSS-REFERENCE TO A RELATED APPLICATION

Applicants claim priority under 35 U.S.C. 119 for application, Ser. No. P 16 79 981.8, filed in the Patent Office of the Federal Republic of Germany on Dec. 22, 1967.

BACKGROUND OF THE INVENTION

The field of the invention is plastic and non-metallic article shaping or treating, and the invention is particularly concerned with reshaping a solid workpiece to avoid elastic memory.

The state of the prior art may be ascertained by reference to Kirk-Othmer, "Encyclopedia of Chemical Technology," 2nd Ed., Vol. 3 (1964), under the section "Butylene," pages 830–865, and particularly pages 832 and 846 through 855; Netherlands Pat. No. 6,515,513 of Aug. 4, 1966; the article of G. Natta et al. entitled "Stereospecific Polymerization Mechanism of $\alpha$-Olefins to Isotactic Polymers in the Presence of a Bi-Metallic Catalyst System," which appears in Chim. Ind. (Milan), Vol. 48 (12), pages 1,298–1,306 (1966); "Kunststoffe" Vol. 55, pages 431–437 and 822–827 (1965); and "Chemie-Ingenieur-Technik," Vol. 33, pages 1,063–1,076 (1966).

The Kirk-Othmer Encyclopedia discloses the physical properties and preparation of 1-butene and the preparation of polymers therefrom. The Netherlands Pat. No. 6,515,513 and Italian article of G.Natta et al. disclose the polymerization of 1-butene in the presence of ethyl aluminum chlorides and titanium trichlorides to form isotactic poly-1-butene.

It is known from the articles of "Kunststoffe" and "Chemie-Ingenieur-Technik" that isotactic poly-1-butene passes while in the solid phase through two different modifications of the crystal lattice structure after it has solidified from the melt. According to these disclosures, the time interval for the complete transition of the crystal lattice structure from the structure present at solidification to the final structure is several days. During this practically complete transition of the crystal lattice structure, certain properties of the poly-1-butene, such as density, specific gravity, stress, etc., are changed to a marked extent.

Poly-1-butene is a thermoplastic synthetic material produced by the polymerization of 1-butene. The polymerization process is conducted in accordance with the so-called low pressure method in the presence of Ziegler-Natta catalysts which effect stereospecific orientation of the monomers. As disclosed by the Netherlands patent and the Italian article of G. Natta et al., the catalysts comprise the simultaneous employment of two substances, namely organo aluminum compounds such as diethylaluminum monochloride and a heavy metal halide, for example, titanium trichloride.

As in the case of other thermoplastic materials, the poly-1-butene is worked into shaped bodies and semi-finished articles in a conventional manner by employing the operating steps of melting the material, molding the melt and solidifying the polymer. These basic processes are employed when the material is worked by injection molding, extrusion into pipes, profiles, sheets, foils, etc., blow molding, thermoforming and by rotation casting.

The conventional hot-forming of thermoplastic materials also comprises forming or sizing operations on hot extrudate. The forming is carried out e.g. by means of a forming die immediately after the hot thermoplastic materials leaves the extruder, the temperature of the material still being above the softening point. (Modern Plastics Encyclopedia, 1968, p 767, "Post-Extrusion Forming")

In addition to the above described hot-forming processes, semi-finished products of thermoplastic synthetic materials are also cold formed. The cold forming method for producing formed parts from semi-finished products are limited in their applicability as a result of two phenomena which interfere, namely, elastic memory and rupture.

Cold formed thermoplastic materials exhibit the property of so-called elastic memory. These cold formed thermoplastic materials show a tendency to return from the shape from which they were forced during the forming process into the original shape partially by elasticity, and partially by creep. In the manufacture of plastic cups, for example, the cups that are deep-drawn in a fluid forming machine show a so called circumferential and axial springback (see Modern Plastics, Nov. 1968, p 240 to 273, "Factors Effecting Cold Forming of Thermoplastics").

Thermoplastic materials exhibit a resistance to being formed in the cold phase and this requires the employment of strong forming tools. As a result of this resistance, a high strain is placed on the formed material so that rupture or weakness occurs.

SUMMARY OF THE INVENTION

Having in mind the limitations of the prior art, it is an object of the present invention to prepare dimensionally stable shaped articles from isotactic poly-1-butene by supplementing the conventional hot forming method while avoiding the limitations of the cold forming method.

The prior art cold forming limitations of elastic memory and rupture are avoided according to the present invention by cold forming into the final shape the semi-finished products within 30 minutes after the semi-finished products have cooled from the melt and then storing the shaped articles for about 0.5 to 12 hours while avoiding the effect of larger forces on the articles.

A suitable poly-1-butene is an isotactic one and it is produced, for example, according to the methods of Ziegler-Natta while using a mixed catalyst of diethylaluminum monochloride and titanium trichloride. "Isotactic" means a polymer which has substantial isotactic proportions wherein atatic and stereoblock isomer proportions do not predominate. In a particular polymer, the isotactic, atactic and stereoblock proportions are always present at the same time, but in the polymer of the present invention the isotactic proportions predominate.

Semi-finished products are understood to mean all prefabricated shapes, such as sheets, rods and the like, and also finished products of all types which are subjected to a further shaping process by a post treatment in accordance with the present invention.

In order to form the poly-1-butene into semi-finished products, the polymer is shaped at a temperature of about 200° to 280° C, and then cooled to below its melt temperature of 125° to 130° C.

The cold forming step is conducted within 0 to 30 minutes, preferably 0 to 5 minutes, after solidification. This step is carried out in the cold at a temperature below the softening point of 125° C, particularly below 80° C and preferably at 20° to 40° C.

The cold forming step is performed with selectively low power and with simple tools such as simple molds of either positive or negative shape, as well as simple wooden or aluminum frames or plaster bodies or bodies of reinforced polyester material. The molds do not have to be cooled or heated. The adjustment of the poly-1-butene material to the surface of the mold may be achieved by manual pressure, also by means of air pressure or vacuum in fluid forming machines. Simple devices for bending, twisting, folding, embossing of sheet or strip may also be cited as examples. The shaped piece gained by the cold forming step gradually solidifies and reaches its final hardness after a period of time of about 12 hours.

If "larger forces" on the shaped piece are avoided within this period after the cold forming step, the material does not exhibit any strong resiliency and retains its newly acquired shape. This condition may be fulfilled by storing the shaped piece under ambient temperature. There are no adverse effects with respect to the quality of the piece, when the storage is longer than 12 hours.

By "larger forces" is meant such forces creating tensile or compressive stresses exceeding the order of magnitude of 10 kg/cm$^2$.

The expression "larger forces" also includes the force of gravity when large and heavy shaped pieces are involved. The effect of the force of gravity can be overcome by supporting the cold formed piece to counteract the gravity, for example, by a pattern mold as described by a wooden frame supporting the cold formed piece in a way that the piece rests on one or several points of support or on the circumference of one or several cross-sectional parts of the frame.

The novel process of the present invention makes it possible to simplify and economize the manufacture of shaped articles and also provides the only possible means for producing specially shaped articles. For example, according to the present invention, it is easy to produce shaped pieces having undercuts or corrugations as they occur in automobile body parts.

DESCRIPTION OF THE PREFERRED EMBODIMENTS

Other applications of the present invention can be seen from the specific examples which follow.

The poly-1-butene employed in the specific examples is produced in a discontinuous polymerization process by the low pressure method according to Ziegler-Natta in an enameled agitated kettle having a volume of 8 cubic meters. In this process titanium trichloride and diethylaluminum monochloride are employed as a mixed catalyst in the molar ratios of 1 mol titanium trichloride to 1.1 mols diethylaluminum monochloride to 1 mol titanium trichloride to 2.5 mols diethylaluminum monochloride. However, other conventional combinations are usefully employed which yield a sufficiently isotactic poly-1-butene. A sufficiently isotactic poly-1-butene is defined as having more than 70 percent, preferably more than 90 percent of isotactically built molecule chains. The poly-1-butenes of the present invention have solution viscosities of $\eta_{red}$ from preferably 1 to 10, wherein the volume percent concentration of polymer is 0, 1 g/100 cm$^3$, the solvent is decalin, and the temperature is 135° C.

Poly-1-butenes also exhibit $i_5$ melt indices of 0, 05 to 100 grams per 10 minutes, wherein $i_5$ is defined as in German Standards DIN 53735, 5 meaning 5 kp of load on the melt in the viscosimeter.

The polymerization is advantageously conducted within a temperature range of about 20° – 50° C in the presence of a hydrocarbon mixture which is liquid under the reaction conditions. Optionally, a moderate superatmospheric pressure is used. Thereby the polymer is obtained in the suspended form.

After termination of the polymerization, the catalysts are decomposed by alcohol and the polymer is separated from the carrier liquid by filtering or decanting and drying in a warm gas stream.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1.

A solid rod of poly-1-butene having a diameter of 6 mm, a solution viscosity of $\eta_{red}$ equal to 4.8, and a melt index of $i_5$ equal to 0.5 grams per 10 minutes, is continuously extruded in the form of a melt, formed into a straight rod by means of a gauge while still in a pasty condition and cooled with water to room temperature. The temperature of the rod is 22° C. One minute and ten seconds after extrusion a cut-to-length piece of rod one-half meter long is coiled around a mandrel having a diameter of 30 mm so that the individual turns are in contact with one another. After termination of the coiling process, which lasts about 1 ½ minutes, the mandrel is pulled out from the coils and the helically wound rod is obtained. The helically wound rod is now stored for 8 hours without placing any strains thereupon. Thereafter the shaped article has sufficient stability for use as a helical spring adapted to apply a light tension load.

EXAMPLE 2.

By means of a hot press, a poly-1-butene sheet is produced having the dimensions 1 meter by 1 meter by 4 millimeters. The poly-1-butene has a solution viscosity of $\eta_{red}$ equal to 4.6 and a melt index of $i_5$ equal to 1.0 grams per 10 minutes. Approximately 30 seconds after removal of the mold, the sheet having a temperature of 31° C, is pulled over a plaster body having a positive form of a boat body. The power expended to accomplish this step is minor and is provided manually under favorable conditions. This manual operation is carried out by two workers, who take the sheet from the press, then place it on the plaster body. The very soft sheet will bent downwards on both sides of the plaster body by its own gravity. Then, from each side, one worker begins pressing the sheet downwards with his hands, directly on the rounded surface of the plaster body, simultaneously smoothing the sheet with his hands and thus gradually fitting the sheet closely to the plaster body.

After 5 minutes the shaped article is pulled off the plaster body and stored for 10 hours so that only small force effects occur in the wall. The blank is cut along its upper edges to even it up and results in a stable boat hull. Mallets or similar tools were not used in this case. This operation can be carried out with bare hands, because the temperature of the sheet has dropped enough to enable the workers to hold the sheet firmly.

EXAMPLE 3.

An extruded solid cord of poly-1-butene having a diameter of 10 mm is extruded into a rod in accordance with the process described in Example 1, gauged and cooled and then cut into a length of 100 mm. Three minutes after extrusion, the rod is pushed into a welded steel pipe having an internal diameter of 10.5 mm and a length of 80 mm so that 10 mm of the poly-1-butene rod projects at each end. Now both projecting ends are simultaneously shaped into rivet heads by clinching. A combined element is obtained which cannot be manufactured by injection molding procedures due to the rough dimensional tolerances of welded steel pipe. (Only metallic pipes having particularly accurate dimensions can be inserted into injection molds before the molding step).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:
1. A process for fabricating poly-1-butene having at least 70 percent isotactic structure into dimensionally stable shaped parts comprising:
   a. forming molten isotactic poly-1-butene into a semi-finished shape at about 200°–280° C and permitting the semi-finished shape to cool below the melt temperature of about 125°–130° C;
   b. cold forming resultant semi-finished product at below 80° C into a final shape within about 30 minutes of solidification;
   c. storing the finally shaped article at least about 0.5 hour while avoiding forces on the article creating tensile or compressive stresses exceeding the order of magnitude of 10 kg/cm$^2$.
2. The process of claim 1, wherein said semi-finished products are cooled to a temperature of about 20° – 40° C. prior to said cold forming.
3. The process of claim 1, wherein said cold forming is carried out within 0 to 5 minutes of cooling.
4. A process as defined by claim 1 wherein step (c) is conducted for at least about 8 hours.
5. A process as defined by claim 1 wherein step (c) is conducted at ambient temperature.
6. A process as defined by claim 4 wherein step (c) is conducted at ambient temperature.
7. A process as defined by claim 1 wherein said cold forming is conducted by bending.
8. A process as defined by claim 1 wherein said cold forming is conducted by twisting.
9. A process as defined by claim 1 wherein said cold forming is conducted by folding.
10. A process as defined by claim 1 wherein said cold forming is conducted by embossing.

* * * * *